W. Hedges.
Evaporating Pan.
No. 1,347. Reissued Oct. 28, 1862.
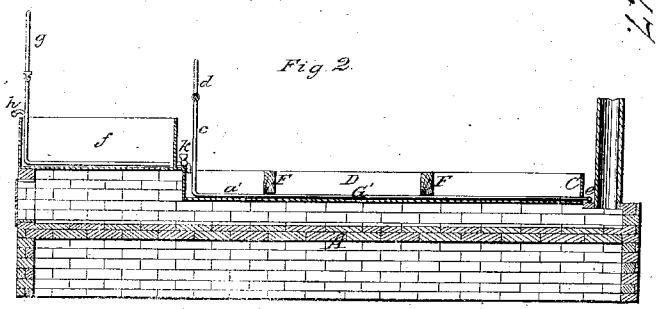
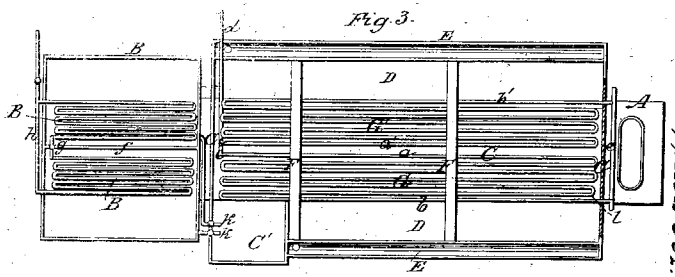
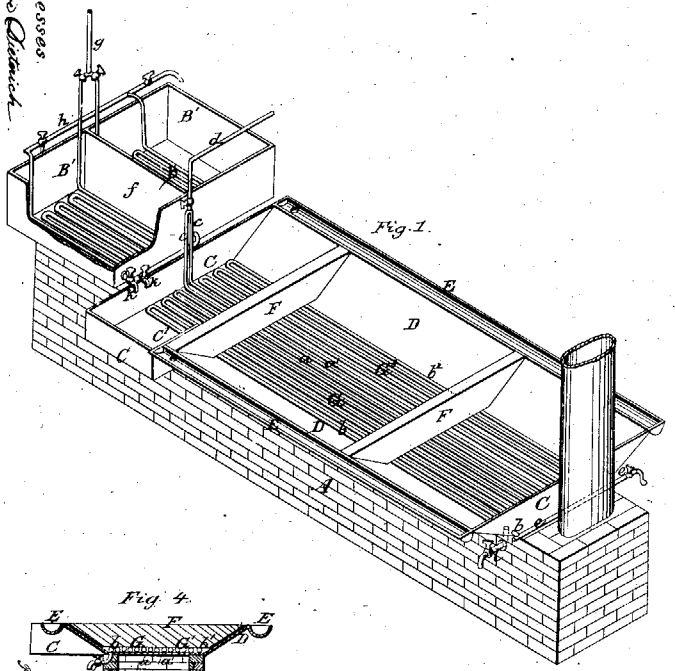
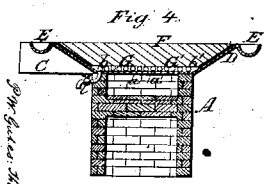
Witnesses.
Gustave Dietrich
Dewitt C. Lawrence.
Inventor.
P. W. Gates: Thomas Chahnn & D. R. Hees
assignees of
Wheeler Hedges & P. W. Gates
by Mason Fenwick & Lawrence
their Attys

UNITED STATES PATENT OFFICE.

P. W. GATES, THOMAS CHALMERS, AND DAVID R. FRASER, OF CHICAGO, ILLINOIS, ASSIGNEES, BY MESNE ASSIGNMENTS, OF WHEELER HEDGES, OF SAME PLACE.

IMPROVEMENT IN EVAPORATING SUGAR JUICES AND SOLUTIONS BY MEANS OF STEAM.

Specification forming part of Letters Patent No. 26,325, dated November 29, 1859; Reissue No. 1,347, dated October 28, 1862.

DIVISION No. 1.

*To all whom it may concern:*

Be it known that WHEELER HEDGES, of Chicago, in the county of Cook and State of Illinois, did invent a new and Improved Mode of Evaporating Sugar and Sirup Juices, for which, on the 29th day of November, 1859, Letters Patent were granted to WHEELER HEDGES and P. W. GATES as assignees of his sole right, title, and interest therein, which Letters Patent were again assigned to P. W. GATES, THOMAS CHALMERS, and DAVID R. FRASER, of the city, county, and State above named; and we, the undersigned, assignees as aforesaid, believing that the said patent is inoperative and invalid by reason of a defective specification, which defect has arisen from inadvertence and mistake, do hereby surrender the same, and file amended specifications, and request that new Letters Patent, under Divisions numbered 1, 2, 3, and 4, may be issued to us for the same invention for the residue of the period for which the original patent was granted on the said amended specifications, which, together with the accompanying drawings, we do hereby declare to be a more full, clear, and exact description of the said WHEELER HEDGES'S new and improved mode of evaporating sugar and sirup juices.

Figure 1 of the drawings shows a perspective view, Fig. 2 a vertical longitudinal section, Fig. 3 a plan, and Fig. 4 a cross section, of an evaporator constructed according to WHEELER HEDGES'S invention.

Similar letters of reference in the several figures refer to corresponding parts.

This invention consists, under this patent, in so employing steam-coils in an evaporating-pan for sugar and sirup juices that the steam, in passing through the coils, expends its intensest heat upon a portion of the juice which is farthest off from where the scum or excrescence of the juice deposits, and then heats the balance of the juice, which is lateral to the more intensely-heated coils, with a gradually decreasing intensity, thus effecting an ebullition which decreases in violence laterally throughout the length of the pan, and causes the scum to flow laterally to the more intensely-heated coils, and to settle equably and completely beyond the side margin or margins of the stream or body of juice.

In the drawings are shown a fire-furnace, A, two preparatory steam-coil heaters and cleansers, B B′, a pan, C, with a lateral end defecator, C′, shallow inclined sides or beaches D D, and gutters E, and partitions F F, which allow the stream of juice across its whole width to flow under them by hydrostatic pressure. These, however, are not included in connection with the invention herein patented and designated by the letters G G′. The steam-coils G G′ are bent back and forward in lengths nearly equal to that of the pan in which they are arranged, and so as to form a heating-surface equal in width, or nearly so, to the entire surface of the bottom of the pan. In the drawings the first bends, *a a′*, of the two coils G G′ are shown as running along the central part of the pan C, and the last bends, *b b′*, thereof as running along the side margins of the bottom of said pan. The first bends form, by means of the vertical extensions *c c*, a connection with a pipe, *d*, leading from the steam-engine boiler, and the last bends a connection with a lateral exhaust-pipe, *e*.

Instead of having the coils run in opposite directions from the center of the width of the pan, the pan may be made with a central partition, as represented at *f*, in the preparatory heaters B B, and the bends commence close alongside the partition and continue until they terminate at the side margins of the bottom of the pan. In this arrangement the contents of each section of the pan would have its scum or excrescence thrown by the effect of ebullition upon but one beach D; or, instead of the pan being divided by a partition, as at *f*, of the preparatory heaters and cleansers, one of its sides may be vertical and the other shallow or inclined, and the steam-coil commence close alongside the vertical side and terminate at the lower edge or terminus of the inclined side. In either of the proposed changes the same result as is aimed to be accomplished by the coils G G′ will be secured, but perhaps not so thorough and economical. It will be evident that if a stream of juice is introduced into the forward end of the pan, and simultaneously therewith steam introduced into the coils at *a a'*, the steam will expend its intensest heat near the center of the bottom of the pan, and at that point produce a violent ebullition of the juice, then continuing its course through the succeeding bends of the coils will gradually lose its intensity, and consequently produce but slight if any ebullition of the juice near the margins of the pan. Therefore the superior ebullition at the center of the pan will be capable of sending the scum and excrescence of the juice toward and upon the beaches or inclined sides of the pan; or, if the steam under similar circumstances was introduced through a bend located alongside a vertical side of the pan, or a partition at the middle thereof, its first intensity would be expended at that point, and violent ebullition produced there, and its next intensity of heat expended in the succeeding bend of the coil, and so on to the margin of the juice. Therefore the scum or excrescence would be thrown laterally upon the beach or beaches forming the inclined side or sides of the pan, and thus the juices cleansed and allowed to flow off freed from any foreign substances.

If the arrangement of steam-coils G G' is used in connection with auxiliaries such as represented, the arch A may be made of brick when most convenient, and should be wide enough to allow the horizontal bottom of the pan to come to the inside, and long enough to support the pan and the preparatory heaters and cleansers B B', and high enough to allow sufficient fire-box and grate bars for the kind of fuel used. The pan C C' may have a flat bottom of a length about six times the width of the bottom, and of copper or other suitable material. The sides may be about eighteen inches wide, and united to the bottom, with their outer upper edge raised above the plane of the bottom about five inches, thus forming flatly-flared sides or beaches that extend outward beyond the outside of the arch, so as not to be exposed to the intense heat of the fire in the arch, in case one is used, and thus present cooling sides of wood or metal, which cause the foam to condense as it flows out toward the edge of the sides. The outer edges of the beaches D D may have troughs or gutters E placed or arranged on or below them, to receive the scum that is scraped off the sides D D, and thus save it for vinegar. The end of the pan may be vertical and about five inches in height. The discharging end of the pan should stand about three-eighths of an inch lower than the receiving end, so that the flow of the juice shall be insured. The preparatory steam-coil heaters and cleansers B B are inclosed by chambers B' B', made rectangular in form, and with any capacity required. The two, when placed side by side, may be about twice the width of the inside of the arch, and should be placed at the end of the pan C C', high enough above the top of the pan to insure the discharge of their contents into it. The defecating-apartment C' of the evaporating-pan may be on the same plane with the bottom of the pan C, and its sides as high as the sides of the pan, but vertical. It is square in form, or nearly so, and its size or width may be about the same as the width of the bottom of the pan, without any separating-partition at the point where it runs into the pan, thus allowing a free communication between them, and the whole may project outside of the flame-flume of the arch and rest upon a lateral extension of brick-work of the arch, so as to be but slightly acted upon by the fire of the furnace in case one is used in it. The coils B B of the preparatory heaters and cleansers are run along the partition *f* of the chambers B', and then back and forth over the bottom of the chambers until the same are covered. The induction ends of these coils are vertical, and run into a supply-pipe, *g*, and are furnished with regulating-cocks. The eduction or exhaust ends of the coils run up vertical and unite with a common exhaust-pipe, *h*, and are also provided with regulating-cocks.

From the preparatory heating and cleansing chambers extend cocks *k k*, for introducing the juice into the defecator, and at the lower or rear end of the pan a faucet, *l*, for letting off the juice, is provided.

In order to prevent the foam from passing too freely from one end of the pan to the other, the crosswise-arranged division-boards F may by provided. These boards are fitted loosely down upon the steam-coils G G' of the pan C, so as to leave a space under them for the flow of the juice, but not large enough to allow the sediment to pass along with the juice.

To employ this invention, in connection with the auxiliaries described, for making sirup or sugar, fill the chambers B' B', then let the steam into the coils B B. When the juice is sufficiently heated and partly cleansed, draw it off into the defecator and pan C C' until the coils G G' are nearly covered; then let the steam into the pipes G G', when a powerful ebullition will commence. By reason of the direct steam entering the middle bends of the coils first, that portion will be the hottest, and this will cause the foam or scum of the boiling juice to rise highest in the middle and to flow upon the incline sides or beaches, and there remain ready to be conveniently removed with a scraper into the troughs. Thus is effectually eradicated all substances that would injure the quality of the sugar or sirup. In case the evaporation requires to be carried on rapidly, or more so than what the steam-coils in the pan will perform, the fire-arch may be brought into use by building a fire under the pan, and thus the process facilitated; or, in case of the steam-coils not being in operative condition, or the steam not at the command of the operator, the evaporation might be carried on by the fire alone until all was ready; but as the use and connection of the auxiliaries described and shown are merely incidental, we do not claim, under this patent, any of them, nor limit ourselves to their use in connection with the steam-coils in the pan, as practice has demonstrated that the principle of operation involved in the arrangement of the steam-coils is useful in sugar and sirup evaporators which do not have the fire-furnace, nor the lateral end defecator, nor the preparatory heaters, nor other features herein described.

What therefore is claimed is—

The cooking or evaporating of sirup and sugar juices by using steam-coils in such manner as to produce violent ebullition at the point where steam first expends a portion of its heat upon the coils and sirup, and from such point have the ebullition decrease in violence or to subside, so that the scum or feculent matter separated from the juices may be caused to flow toward and equably and completely deposit outside of the side margin or margins of the stream or body of juice in the pan, substantially as set forth.

P. W. GATES.
THOS. CHALMERS.
DAVID R. FRASER.

Witnesses:
WILL. A. PRATT,
J. L. FARGO.